June 7, 1966  J. VAN BROEKHOVEN ETAL  3,255,373
HALOPHOSPHATE PHOSPHOR MATERIAL OF IMPROVED LUMINOSITY
AND MAINTENANCE CHARACTERISTICS FOR FLUORESCENT LAMPS
Filed Sept. 18, 1957
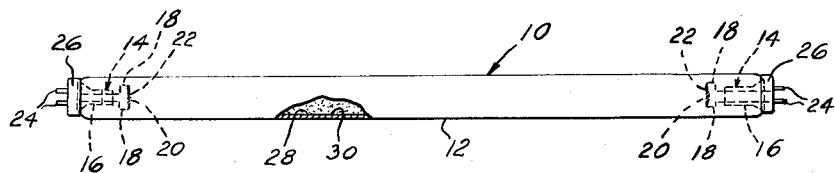
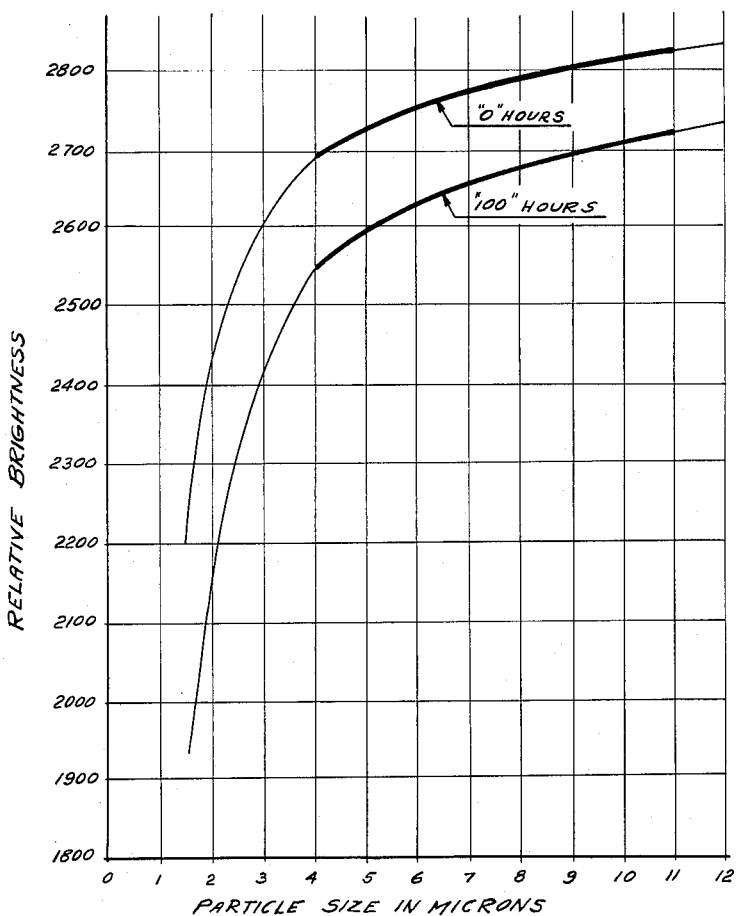
INVENTOR
J. VAN BROEKHOVEN and
R. W. REPSHER.
BY  W. D. Palmer
ATTORNEY "3,255,373
HALOPHOSPHATE PHOSPHOR MATERIAL OF IMPROVED LUMINOSITY AND MAINTENANCE CHARACTERISTICS FOR FLUORESCENT LAMPS
Jacob Van Broekhoven, North Caldwell, and Robert W. Repsher, Kinnelon, N.J., assignors to Westinghouse Electric Corporation, East Pittsburgh, Pa., a corporation of Pennsylvania
Filed Sept. 18, 1957, Ser. No. 684,781
11 Claims. (Cl. 313—109)

This invention relates to phosphors, fluorescent lamps, and to methods for producing improved phosphors for fluorescent lamps and, more particularly, to an improved halophosphate phosphor, to a fluorescent lamp which incorporates an improved halophosphate phosphor and to methods for processing halphosphate phosphor materials.

Halophosphate phosphor materials for fluorescent lamps are well known and are described in U.S. Patent No. 2,488,733 to McKeag and Ranby. These halophosphate materials are generally analogous to the natural mineral apatite and will display substantially the same X-ray diffraction pattern as this mineral. Briefly these halophosphate materials may be represented by the matrix $$3M_3(PO_4)_2 \cdot 1M'L_2$$

where L represents a halogen or mixture of halogens and M and M' represent either different or identical bivalent metals or mixtures of such metals. In practice, the primary constituent for most halophosphate phosphor is calcium orthophosphate although strontium orthophosphate is used in some limited cases. The halide constituent normally comprises calcium chloride or fluoride or strontium chloride or fluoride or mixtures of both and the activator materials are normally antimony or antimony plus manganese. The great majority of fluorescent lamps which are now manufactured in this country incorporate such a phosphor and the term "halophosphate" has become generic to the art for a phosphor of the foregoing general formulation and structure.

The fluorescent lamp art is highly competitive and a lamp which has an output of one or two lumens per watt greater than a competitive lamp will normally be sold over the competitive lamp. The art has placed much stress on output and efficiency as well as maintenance of performance and any improvement which will result in an appreciable increase in output and efficiency as well as maintenance has a great effect in promoting one lamp over another competitive lamp.

It is the general object of this invention to provide an improved halophosphate phosphor for fluorescent lamps which will have improved output and maintenance characteristics.

It is a further object to provide a method for improving the luminosity output and maintenance characteristics for halophosphate phosphors for fluorescent lamps.

It is another object to provide a fluorescent lamp which incorporates an improved halophosphate phosphor material so that the luminosity output and the maintenance characteristics of the lamp are improved.

It is still another object to provide preferred methods for improving the luminosity output and maintenance characteristics for halophosphate phosphors.

The aforesaid objects of the invention, and other objects which will become apparent as the description proceeds, are achieved by providing a fractionating procedure wherein very fine phosphor particles are removed. For optimum appearance there is also provided a method for removing the extremely coarse phosphor particles. The resulting phosphor when incorporated into a fluorescent lamp will result in improved luminosity response and in improved maintenance characteristics for the lamp.

For a better understanding of the invention, reference should be had to the accompanying drawing wherein:

FIG. 1 is an elevational view, partly in section, of a fluorescent lamp embodying the improved halophosphate phosphor material of this invention;

FIG. 2 is a graph of lamp brightness for the operating lamps versus minimum particle size for the phosphor as coated onto the lamps.

Although the principles of the invention are applicable to any type of fluorescent lamp, the most common type of fluorescent is the 40W T12 type and hence this type of lamp will be considered in detail.

With specific reference to the form of the invention illustrated in the drawing, the numeral 10 in FIG. 1 illustrates generally a 40W T12 type fluorescent lamp comprising a tubular vitreous envelope 12 which may be fabricated of soda-lime-silica glass, for example, having mounts 14 sealed into either end thereof, as is customary. Each mount comprises a vitreous portion 16 sealed to the end of the envelope 12 with lead conductors 18 sealed therethrough and supporting at their inwardly-extending extremities refractory metal coils 20, which may be fabricated of tungsten, for example. These coils are normally of a coiled-coil construction or of a triple-coil construction, such constructions being well known, and contained within the turns of the inner coil or coils is a filling of electron-emitting material 22. Such electron-emitting materials are well known and normally comprise a mixture of alkaline-earth oxides which may have some other materials such as zirconia added thereto. As a specific example, the electron-emitting material may comprise a mixture of 60% by weight barium oxide, 30% by weight calcium oxide and 10% by weight strontium oxide and the electron-emitting material may have an additive such as 0.9% by weight of zirconia, if desired. This specific electron-emitting material is given only by way of example and many other mixtures of alkaline-earth materials or even single alkaline-earth materials may be used if desired, as is well known.

Electrical connection for the lead conductors 18 is normally effected by contact pins 24 which project from supporting base caps 26 at either end of the lamp. The envelope 12 has coated on its interior surface a phosphor material 28, which in accordance with this invention is a halophosphate phosphor material which has been processed by the improved method described herein. The envelope also contains a small filling of argon or other inert, ionizable gas, at a pressure of about 4 mm. for example, in order to facilitate starting, although other starting gas fill pressures may be used, as is well known. Also contained within the envelope is a small charge of mercury 30, as is customary. In the operation of such a lamp the phosphor responds to the 2537 A.U. resonant radiation of the mercury discharge to produce visible light, as is well known.

In preparing the improved halophosphate phosphor material, the raw-mix constituents are mixed together and fired in accordance with the general techniques for preparing halophosphate phosphor materials. Following are specific examples:

*Example I*

Raw-mix constituents: Grams
CaO _____ 583
$P_2O_5$ _____ 538
Mn (added as manganous carbonate) _____ 10.17
$Sb_2O_3$ _____ 31.0
$SrCl_2$ _____ 48.0
$CaF_2$ _____ 77.3

Note: In the foregoing example, the metal to phosphorus molar ratio may vary from 4.65 to 4.92 to 3. The halide to phosphorus ratio may vary from 1.02/6 to 1.23/6. The chlorine to fluorine ratio may vary from 1 mole chlorine to 6 moles fluorine to 1:1. The antimony may vary from about 1% to about 4% by weight of the phosphor and the manganese may vary from about 0.7% to about 0.9% by weight of the phosphor.

The foregoing raw-mix constituents are thoroughly mixed or blended by means of a pebble mill, for example. These mixed raw-mix constituents are then fired in a covered crucible at a temperature of about 1185° C. for a period of three hours, although the firing temperatures may vary from 1140° C. to 1195° C., for example, the higher the firing temperature, the shorter the firing time. Also, the firing time will vary with the batch size and depth of material in the crucible. After the first firing, the phosphor material may be milled to an average particle size of from 1.8 to 4.0 microns (preferably about 3.0 microns, for example) and then refired at a temperature of from 1100° C. to 1130° C., for example, the higher the firing temperature the shorter the firing time. The preferred refiring temperature is about 1120° C. for about 2½ hours. The phosphor is thereafter reduced to finely-divided status and this will produce what is known as a 4500° K. halophosphate having I.C.I. color coordinates of about $x=0.361$ and $y=0.370$.

*Example II*

Raw-mix constituents: Grams
  $CaO$ _____ 63.6
  $P_2O_5$ _____ 54.4
  $Sb_2O_3$ _____ 1.48
  $CaF_2$ _____ 8.92

The foregoing phosphor raw-mix constituents may be mixed and fired in a covered crucible at a temperature of about 1180° C., for example, and thereafter reduced to an average particle size of about 3.0 microns. The milled phosphor may be then refired at a temperature of about 1130° C. for about 2½ hours and this will produce a blue halophosphate having I.C.I. color coordinates of about $x=0.215$ and $y=0.268$.

*Example III*

Raw-mix constituents: Grams
  $CaO$ _____ 569
  $P_2O_5$ _____ 538
  Mn (as manganous carbonate)_____ 21.50
  $Sb_2O_3$ _____ 31.0
  $SrCl_2$ _____ 48.0
  $CaF_2$ _____ 77.3

The foregoing materials may be mixed and fired in a covered crucible at a temperature of about 1140° C. for about 3 hours and thereafter milled to an average particle size of about 3 microns. Thereafter the milled phosphor material may be refired at a temperature of about 1090° C. for about 2½ hours and this will produce a phosphor which is known as a warm-white halophosphate having color coordinates of about $x=0.436$ and $y=0.404$.

*Example IV*

Raw-mix constituents: Grams
  $CaO$ _____ 569
  $P_2O_5$ _____ 538
  Mn (as manganous carbonate)_____ 16.25
  $Sb_2O_3$ _____ 31.0
  $SrCl_2$ _____ 48.0
  $CaF_2$ _____ 77.3

The foregoing raw-mix constituents may be mixed and fired at 1130° C. for about 3 hours and thereafter milled to an average particle size of about 3.0 microns. The milled phosphor may be refired at about 1120° C. for about 2 hours and this will produce a 3500° K. halophosphate.

The four specific examples given hereinbefore cover a wide range of halophosphate materials and any of these examples may be fractionated in accordance with the procedures outlined hereinafter. It should be understood that these following procedures apply to any halophosphate phosphor material and any of the specific examples as given in Patent No. 2,488,733 to McKeag and Ranby may also be treated by the instant process with similar beneficial results.

Fractionation of a halophosphate phosphor material in order to remove the smaller particle sizes may be accomplished in a plurality of ways although the preferred procedure is a liquid-settling procedure. As a specific example, any of the foregoing halophosphate examples first may be reduced to a finely-divided status. This degree of first reduction is immaterial and a prolonged reduction period will result in the production of many ultra-fine particles of phosphor and a minimum of larger agglomerates and larger phosphor particles. A relatively short reduction period will result in a relatively small amount of ultra-fine phosphor material, but will also result in a correspondingly greater amount of large-size particles and particle agglomerates. When fractionating the phosphor particles by the procedures outlined hereinafter, the percentage of ultra-fine particles which are present and the percentage of large particles and particle agglomerates which are present are immaterial as the fractionating procedure will substantially segregate the individual particles according to particle size no matter what the initial percentage of any given particle size.

As a specific example, the halophosphate phosphor material given hereinbefore under Example I may be reduced in a hammer mill to an average particle diameter of about 7 microns. After reduction, the finely-divided phosphor may be introduced a liquid vehicle, such as water, and stirred to form a slurry. As a detailed example, one kilogram of the 4500° K. halophosphate phosphor of Example I may be stirred into three liters of water in a container having a height of fifteen inches. It should be noted that the relative concentrations of phosphor and water are in no way critical and may be varied over a wide range. The resulting slurry is preferably made slightly basic with a particle-dispersing medium such as ammonium hydroxide which may be added in sufficient amount to produce a pH of from about 8 to 9, for example, and a pH of 8.5 has been found to be very satisfactory. Other particle-dspersing media may be substituted for the ammonium hydroxide, such as sodium or potassium hydroxides or amines and trimethyl amine, methyl amine or dimethyl amine, for example, may be substituted in place of the ammonium hydroxide.

For the specific example of phosphor-water concentration given hereinbefore, the dispersed phosphor may be allowed to settle for a period of approximately 3 hours. Thereafter the phosphor which has settled more than one foot in this period is separated from the liquid medium by decanting the fine-phosphor-containing supernatant liquid. This suspension, settling and decantation procedure is desirably repeated with the settled phosphor which is separated after each settling period from the fine-phosphor-containing supernatant liquid. For the foregoing specific example, it has been found that after four settling periods, the supernatant liquid above the settled phosphor will be substantially clear. Repetition of the settling and decantation after the initial step is not absolutely necessary but is desirable, since the larger phosphor particles which settle first tend to carry with them some limited amounts of the ultra-fine phosphor particles and repetition of the settling and decantation substantially eliminates the small amount of residual ultra-fine particles.

The foregoing phosphor material will contain substantially no phosphor particles which have an average particle diameter of less than about 4 microns. However, the settled phosphor will contain some larger-size particles and particle agglomerate and it may be desirable to remove these larger-size particles and agglomerates in order to improve the appearance of the phosphor coating on the fluorescent lamp. Removal of such larger particles, however, is not absolutely necessary as such larger particles and particle agglomerates will only result, in some cases, in a somewhat-grainy appearance in the coating and will have no other deleterious effects. Removal of substantially all phosphor particles and particle agglomerates larger than about 11 microns may be accomplished by again forming a slurry of one kilogram of the settled phosphor, which has the ultra-fine particles removed, in three liters of water with a dispersing agent as hereinbefore indicated. The phosphor particles which settle more than one foot within a period of five minutes are separated from the remaining supernatant liquid which contains the comparatively smaller particles and these remaining smaller particles will have an average particle diameter within the range of from about 4 microns to about 11 microns. If desired the largest particles and particle agglomerates may be removed from the phosphor before the ultra-fine particles are removed. This may be accomplished by reversing the order of the foregoing settling steps.

The foregoing separated phosphor particles which have an average particle diameter of from about 4 to about 11 microns may then be coated onto a fluorescent lamp envelope by conventional techniques. If a butyl acetate-nitrocellulose lacquer is to be used in coating the phosphor, the phosphor is first dried and then admixed with the butyl acetate. As a specific example, 200 kilograms of the foregoing 4500° K. halophosphate may be mixed with 75 liters of butyl acetate and 25 liters of butyl acetate having therein 2% by weight of nitrocelluose and a number 7 Parlin Cup viscosity of 65-75 seconds. This mixture is gently stirred to form a homogeneous suspension or "paint" of the phosphor particles which have an average diameter of from about 4 to about 11 microns and this "paint" may be further thinned, if desired. The "paint" is then flushed over the inside of a fluorescent tube, after which the nitrocellulose binder is volatilized by lehring the coated envelope at a temperature of about 650° C., for example. In a 40W T12 type lamp, approximately 5 grams of phosphor will be deposited on the lamp envelope by this technique. Of course the amount of deposited phosphor may be varied somewhat, if desired.

Control lamps were fabricated from the same phosphor, as in the previous example, but eliminating the fractionation process disclosed herein. The output of the lamps incorporating the fractionated phosphor averaged approximately 72 lumens higher which represents approximately a 1.8 lumen per watt improvement.

Extensive tests were conducted on the relative output of fluorescent lamps coated with halophosphate phosphors of varying particle sizes. In preparing the phosphors for lamp coating, the water-settling technique was carried out in the manner as hereinbefore described except that different fractions of the phosphor were removed according to their settling times. The first fraction which was separated was that finely-divided phosphor which would not settle more than one foot in a twenty-hour settling period. The phosphor which did settle more than one foot within the twenty-hour settling period was again suspended in the water vehicle which contained the ammonium hydroxide dispersing agent. This suspension-settling procedure was repeated four times and the supernantant liquid was substantially clear at the end of the last twenty-hour settling period. The settling period was shortened somewhat to remove the next-larger phosphor fraction and repeated until the supernatant liquid remaining above the settled phosphor was clear. The setting period was then progressively shortened until the phosphor was separated into individual fractions, each representing progressively-larger particle sizes. Each of the fractions as they were separated were filtered from the supernatant liquid and dried for coating onto lamps. Each of these fractions, except for the final fraction, were then incorporated into lamps in a manner as hereinbefore described, and each of the lamps were coated to a phosphor-coating weight so as to produce optimum fluorescent output. The final fraction which settled more than one foot in less than five minutes was discarded as being too large to produce a uniform-appearing coating since maximum particles size which the phosphor materials desirably should have is about 11 microns.

As noted hereinbefore, however, some particles larger than about 11 microns may be tolerated and these will only affect somewhat the appearance of the coated lamp will not affect the lamp performance.

The foregoing lamps were placed on test and in FIG. 2 the initial and the 100-hour output readings are plotted as relative brightness versus particle size for the phosphor coated onto the lamps. As seen in this figure, the curve breaks at a particle size of about 4 microns and if maximum luminosity is to be achieved from the fluorescent lamp, the halophosphate phosphor particles should contain substantially no particles having a diameter of less than about 4 microns.

In determining the phosphor particle diameters of the individual phosphor fractions, it has been found convenient to use an instrument marketed by Fisher Scientific Co. of Pittsburgh, Pa., under the trademark "Sub Sieve Sizer" and such an instrument is described in Patent No. 2,261,-802. In using this instrument, the phosphor true density was taken as 3.15 grams/cc. This instrument and the proposed tentative method for a standardized test are thoroughly discussed in ASTM letter dated September 23, 1955, which is a proposed outline preparatory to ASTM standardization of this instrument. This method of test was used in operating the instrument. Briefly, the Fisher "Sub Sieve Sizer" employs the air-permeability method of measuring average particle size of powders and is comprised of an air pump, an air pressure regulating device, a precision bore sample tube, a standardized double range air flow meter and a calculator chart. For purposes of standardization, the ASTM has recommended a sample of National Bureau of Standards cement No. 114 as the primary standard and the equipment is calibrated in terms of this cement. There are various other types of equipment for determining the average particle size of finely-divided materials, but the Fisher "Sub Sieve Sizer" has been found to be quite satisfactory. While halophosphate phosphor particles are normally somewhat irregular in shape, the air-permeability method for measuring average diameter is quite accurate.

Maintenance performance data were also taken on the foregoing lamps and at 100-hours operation the lamps coated with phosphor particles having an average diameter of about 4 microns and greater had a minimum output maintenance of 94% of initial output. This so-called output maintenance for the lamps became increasingly poorer as the phosphor fractions became smaller in size and with the smallest fraction (the 20-hour settling fraction) the 100-hour maintenance was 86.9% of the initial output of these lamps. At 4000 hours operation, this improvement in maintenance has been found to be progressive and the lamps coated with the fractions having an average particle daimeter of about 4 microns and greater displayed a minimum maintenance of about 82% of initial output while the lamps coated with the 20-hour fraction displayed a maintenance of approximately 63.5% of initial output. It is thus apparent that not only is the output for the lamps coated with the larger phosphor particle sizes appreciably greater, but the maintenance is also improved.

In the foregoing specific example, the phosphor material was fractionated in a water vehicle. Any suitable liquid vehicle may be used and butyl acetate has also been found to be satisfactory using a small amount of nitrocellulose as the phosphor dispersant. As a specific example, one kilogram of phosphor may be suspended in three liters of butyl acetate containing 0.3% by weight of 1000-second nitrocellulose. Such a procedure is particularly advantageous where the phosphor paint uses butyl acetate with a nitrocellulose binder as a vehicle since no drying of the phosphor is required before it is formed into the paint. If a water vehicle paint is to be used in coating the phosphor onto the lamp, the water vehicle is preferably used in fractionating the phosphor.

It will be recognized that the objects of the invention have been achieved by providing an improved halophosphate phosphor for fluorescent lamps which will have improved output and maintenance characteristics and there has also been provided a method for producing such a phosphor. In addition there has been provided a fluorescent lamp wherein the luminosity output and maintenance characteristics for the lamp are improved and there have also been provided preferred methods of processing halophosphate phosphors.

As a possible alternative embodiment, the improved halophosphate phosphors disclosed herein may be admixed or blended with other phosphor materials in order to achieve desired color effects in the coated lamps. As a specific example, a "soft white" blended phosphor may be prepared by admixing the following:

| Phosphor: | Percent by wt. |
| --- | --- |
| 4500° K. halo (Example I) | 20.8 |
| Blue halo (Example II) | 28.0 |
| Calcium silicate: .03% Mn: .0045% Pb | 51.2 |

Many other blends which incorporate varying proportions of halophosphate phosphor material may be prepared as is well known.

While in accordance with the patent statutes, one best-known embodiment of the invention has been illustrated and described in detail, it is to be particularly understood that the invention is not limited thereto or thereby.

We claim:

1. A halophosphate phosphor material for use in fluorescent lamps, said phosphor material being in the form of a plurality of finely-divided particles, and substantially all of said phosphor particles having an average diameter of at least about 4 microns.

2. A halophosphate phosphor material for use in fluorescent lamps, said phosphor material being in the form of a plurality of finely-divided particles, and substantially all of said particles having an average diameter falling within the range of from about 4 microns to about 11 microns.

3. The method of improving the 2537 A.U. luminosity response and maintenance performance of finely-divided particles of halophosphate phosphor material for use in fluorescent lamps, comprising separating from said finely-divided phosphor material substantially all phosphor particles having an average particle diameter less than about 4 microns.

4. The method of improving the 2537 A.U. luminosity response and maintenance performance of finely-divided particles of halophosphate phosphor material for use in fluorescent lamps, comprising separating from said finely-divided phosphor material substantially all phosphor material having an average particle diameter less than about 4 microns and greater than about 11 microns.

5. The method of improving the 2537 A.U. luminosity response and maintenance performance of finely-divided particles of halophosphate phosphor material for use in fluorescent lamps, comprising suspending said finely-divided phosphor material in a liquid vehicle which includes a phosphor-particle dispersing medium, allowing substantially all the suspended phosphor particles having an average particle diameter of about 4 microns and greater to settle in said liquid medium, and separating said settled phosphor particles from said liquid vehicle and the unsettled phosphor particles remaining therein.

6. The method of improving the 2537 A.U. luminosity response and maintenance performance of finely-divided particles of halophosphate phosphor material for use in fluorescent lamps, comprising suspending said finely-divided phosphor material in a liquid vehicle which includes a phosphor-particle dispersing medium, allowing substantially only the phosphor particles having an average particle diameter greater than about 11 microns to settle in said liquid vehicle, separating said settled phosphor particles from said liquid vehicle and the unsettled phosphor particles remaining therein, allowing substantially all the remaining phosphor particles having an average particle diameter of about 4 microns and greater to settle in said liquid vehicle, and separating these latter-settled phosphor particles from said liquid vehicle and from unsettled phosphor particles remaining therein.

7. The method of improving the 2537 A.U. luminosity response and maintenance performance of finely-divided particles of halophosphate phosphor material for use in fluorescent lamps, comprising suspending said finely-divided phosphor material in a liquid vehicle which includes a phosphor-particle dispersing medium, allowing substantially all phosphor particles having an average diameter of about 4 microns and greater to settle in said liquid vehicle, separating said settled phosphor particles from said liquid vehicle and the unsettled phosphor particles remaining therein, resuspending said settled phosphor particles in a liquid vehicle which includes a phosphor-particle dispersing medium, allowing substantially all of said resuspended phosphor particles having an average diameter of greater than about 11 microns to settle in said liquid vehicle, and separating these latter-settled phosphor particles from said liquid vehicle and the unsettled phosphor particles remaining therein.

8. The method of improving the 2537 A.U. luminosity response and maintenance performance of finely-divided particles of halophosphate phosphor material for use in fluorescent lamps, comprising suspending said finely-divided phosphor material in a liquid vehicle which includes a phosphor-particle dispersing medium, allowing the suspended phosphor particles having an average particle diameter of about 4 microns and greater to settle in said liquid vehicle, separating said settled phosphor particles from the liquid vehicle and the phosphor particles remaining unsettled therein, suspending said separated phosphor particles in a liquid vehicle which includes a phosphor-particle dispersing medium, allowing the separated and again-suspended phosphor particles having an average particle diameter of about 4 microns and greater to settle in said liquid vehicle, separating the second-suspended and settled phosphor particles from the liquid vehicle and any phosphor particles remaining unsettled therein, and repeating the foregoing steps of phosphor-particle suspension, phosphor-particle settling and settled-particle separation until substantially all settled and separated phosphor particles have an average diameter of about 4 microns and greater.

9. A fluorescent lamp comprising a tubular light-transmitting envelope having alkaline-earth-oxide-coated coils operatively-disposed at either end thereof, an inert ionizable gas and a charge of mercury contained within said envelope, a phosphor coating on the inner surface of said envelope, said phosphor coating comprising a finely-divided halophosphate phosphor material, and substantially all of the finely-divided particles of said coated halophosphate phosphor material having an average particle diameter of at least about 4 microns.

10. A fluorescent lamp comprising a tubular light-transmitting envelope having alkaline-earth-oxide-coated coils operatively-disposed at either end thereof, an inert ionizable gas and a charge of mercury contained within said envelope, a phosphor coating on the inner surface of said envelope, said phosphor coating comprising a finely-divided halophosphate phosphor material, and substantially all of the finely-divided particles of said coated halophosphate phosphor material having an average particle diameter of from about 4 microns to about 11 microns.

11. A fluorescent lamp including an envelope having on its inner surface a coating of halophosphate phosphor particles substantially confined in size to between about 4 and 11 microns particle size.

(References on following page)

References Cited by the Examiner

UNITED STATES PATENTS

| | | | |
|---|---|---|---|
| 2,176,107 | 10/1939 | Smith | 209—209 |
| 2,579,900 | 12/1951 | Butler | 252—301.4 |
| 2,702,122 | 2/1955 | Joaquin | 209—209 |
| 2,748,306 | 5/1956 | Bjorkman | 313—109 |
| 2,755,254 | 7/1956 | Butler | 252—301.4 |
| 2,774,903 | 12/1956 | Burns | 313—109 |
| 2,887,227 | 5/1959 | Dunham | 252—301.4 |

HERMAN KARL SAALBACH, *Primary Examiner.*

JULIUS GREENWALD, RALPH G. NILSON,
*Examiners.*

J. V. TURA, E. G. GERMAIN, *Assistant Examiners.*